April 5 1932.  L. GREEN  1,852,966
BAKING PAN
Filed May 16, 1930
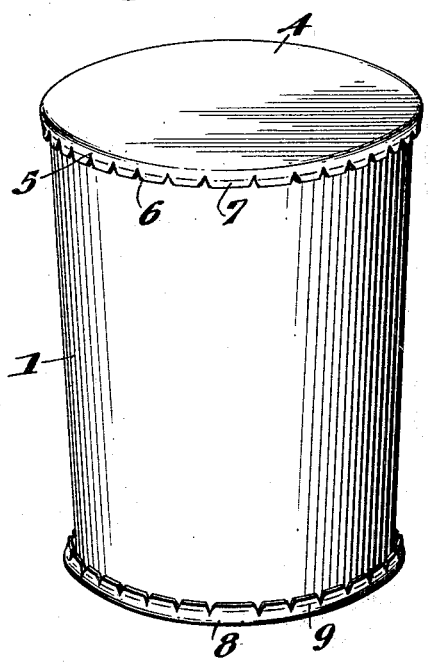
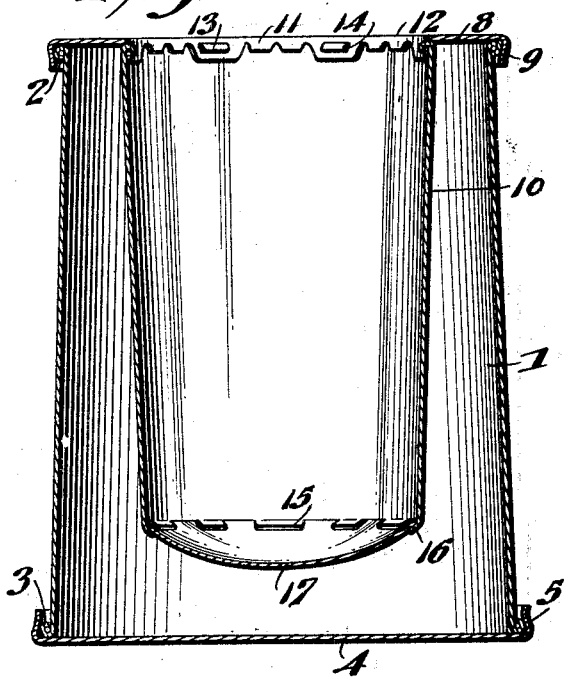
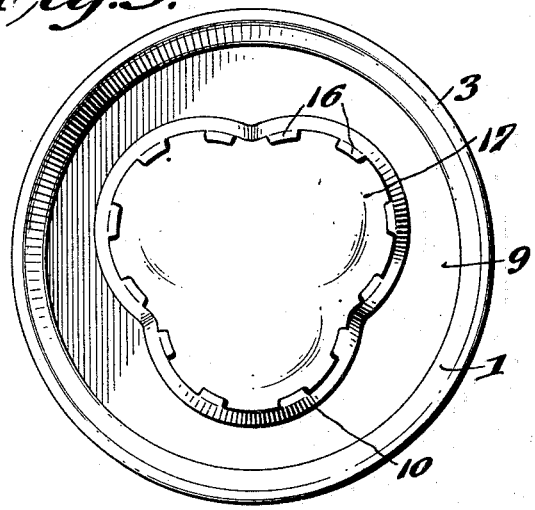
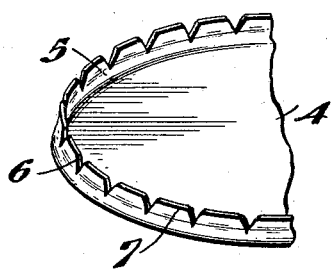
Inventor
Leslie Green
By Lloyd W. Patch
Attorney Patented Apr. 5, 1932

1,852,966

UNITED STATES PATENT OFFICE

LESLIE GREEN, OF PUEBLO, COLORADO

BAKING PAN

Application filed May 16, 1930. Serial No. 453,057.

My invention relates to improvements in baking pans, and particularly to a pan intended and adapted to be used in baking a cake with an open or hollow center so that the same can have a marshmallow, ice cream, or other filling packed therein to be a part of each individual slice as the cake is cut across transversely.

An object of this invention is to provide a pan which is particularly adapted for baking and forming a cake with the center hollow or scooped out, thus leaving a relatively thin shell of cake after the baking, and which is so constructed that the cake can be removed while yet warm without danger of breaking this thin shell.

A further object resides in so constructing and assembling the parts that the pan will form a complete mold to uniformly and perfectly shape each cake to be like others.

Yet another object resides in providing a pan of simple and inexpensive construction which has the parts thereof so arranged that they are readily assembled for use and can yet be easily disassembled for thorough washing and cleaning following this, and for complete greasing prior to baking a cake or pastry shell.

Still another object is to provide a pan of simple and inexpensive construction which can be stamped out of and shaped up from sheet metal at relatively low cost and which will be rigid and substantial upon completion of the formation and assembly to thus well withstand the shocks and wear of use.

With the above and other objects in view, which will be apparent to those skilled in the art, my invention includes certain novel features of construction and combinations of parts which will be hereinafter set forth in connection with the drawings and then pointed out in the claim.

In the drawings:

Figure 1 is a view in perspective of a pan constructed in accordance with my invention, set in the position it will occupy during baking.

Fig. 2 is a vertical sectional view through the pan structure set in the position for filling.

Fig. 3 is a bottom plan view of the showing in Fig. 2 with the cover removed.

Fig. 4 is a fragmentary perspective view to better show one of the covers.

The tubular side wall 1, slightly tapered throughout its length has the beads 2 and 3 rolled out or otherwise formed at its smaller and larger ends respectively. This tubular member is preferably made to be smooth on its inner side, but might be fluted or ribbed longitudinally to give a reverse formation to a cake baked therein, the primary consideration being that the side wall is tapered and must be so formed that the finished cake or pastry shell can be withdrawn therefrom through the larger end at 3.

A closure or cover 4 is provided to be applied over the larger end 3, and the rim flange 5 of this closure or cover is notched at 6 and is bent in at 7 so that as the cover is applied the resilient tongues thus formed will flex to slide over the bead 3 and will resiliently return to hold the cover in place against accidental or casual displacement. A cover formed in this manner can be readily cut and stamped into shape and the cover is easily applied and removed as occasion may require.

A closure 8 is adapted to be fitted over the other end of the tubular side wall 1 and the side rim 9 is constructed in the same manner illustrated in Fig. 4 so that this rim will spring down to engage resiliently over the bead 2 to hold the closure or cover in place. This closure or cover has an opening of any desired shape through its middle portion and a core mold 10 is attached to extend inwardly around the opening. In the present instance I have shown this core mold as being substantially of tri-foil form in cross section, but it can be of any desired cross sectional shape and the tubular side wall 1 might be correspondingly varied to follow the cross sectional contour or to contrast therewith. The cover member 8 has a notched flange 11 bent inwardly around the opening 12 and the core mold 10 substantially fits outside of this flange 11, tongues 13 on the edge of the core mold being inserted inwardly through openings 14 in the flange 11 and then being pinched or bent down inside to secure the parts together. The core mold 10 has its side wall tapered to be of decreasing diameter from the point of attachment to cover 8 toward its opposite extremity, and the length of the wall 10 is such that the core mold stops short of and spaced from the cover end 4. At its depending end the core mold 10 has a series of tongues 15 and 16 alternately bent inwardly and outwardly and clinched against the edge of a dished end member 17. With this manner of attachment the core mold presents an entirely smooth surface on its outer side and as the mold is tapered it can be readily removed from the cake following completion of the baking operation by simply removing the cover 8 and pulling the mold outwardly.

In the use of my improved cake or pastry mold the baking pan will be set as shown in Fig. 2, after the parts have been greased, and with the cover 8 and core mold 10 removed the batter is poured into the pan to a proper depth and the cover 8 is then applied and pressed down to force the core mold 10 into the dough or batter and the pan is reversed end for end to be set as shown in Fig. 1. The batter or dough then runs down over the tubular side wall 1 and the core mold 10 and after a short period the pan can be placed in the oven and the contents baked. As the heat will find its way into the core mold 10, the cake will be evenly baked throughout, and in the baking process the expanding batter or dough will substantially fill the mold. When the baking operation is completed the cover 4 can be removed after which the cover 8 is taken off to withdraw the core mold 10 from the baked cake or pastry, and the tubular tapered side wall will then be removed to leave the baked cake or pastry shell with the opening therein. This cake or pastry shell can be filled with a number of fillings including ice cream, marshmallow and many others, as the cake is cut across transversely this filling will form an integral part of each individual slice.

While I have herein shown and described certain specific embodiments of my invention, it will be understood and appreciated that changes and variations can be resorted to in the form, construction, arrangement and assembly of the parts without departing from the spirit and scope of my invention.

I claim:

A baking pan comprising a tubular sleeve-like side wall tapered throughout its length and provided with beads around its open end, a cover having a rim flange consisting of a plurality of resilient extensions to be fitted upon the bead at the larger end of the tubular side wall to removably hold the cover in place, a smaller cover of similar construction adapted to be removably fitted on the smaller end of the side wall and provided with a central opening, a core mold of sleeve-like form tapered from one end to the other and provided with extending tongue portions at its ends, said smaller cover being provided with openings to receive the extending tongues at the larger end of said core mold to mount the same rigidly in place thereon, and an end member mounted at the smaller end of said core mold and held rigidly in place thereon by clamping said tongues against the end member.

In testimony whereof I hereunto affix my signature.

LESLIE GREEN.